(12) United States Patent
Andersen et al.

(10) Patent No.: US 8,929,813 B2
(45) Date of Patent: Jan. 6, 2015

(54) MONITORING DEVICE AND METHOD FOR WIRELESS POWER TRANSMISSION IN A MONITORING DEVICE

(71) Applicant: Widex A/S, Lynge (DK)

(72) Inventors: Henning Hougaard Andersen, Birkerod (DK); Soren Kilsgaard, Smorum (DK); Niels Ole Knudsen, Humlebak (DK)

(73) Assignee: Widex A/S, Lynge (DK)

( * ) Notice: Subject to any disclaimer, the term of this patent is extended or adjusted under 35 U.S.C. 154(b) by 236 days.

(21) Appl. No.: 13/707,313

(22) Filed: Dec. 6, 2012

(65) Prior Publication Data

US 2013/0095759 A1     Apr. 18, 2013

Related U.S. Application Data

(63) Continuation-in-part of application No. PCT/EP2010/058002, filed on Jun. 8, 2010.

(51) Int. Cl.
| | |
|---|---|
| *H04B 5/00* | (2006.01) |
| *G06K 7/00* | (2006.01) |
| *G06K 7/10* | (2006.01) |
| *G06K 19/07* | (2006.01) |
| *H04B 17/00* | (2006.01) |

(52) U.S. Cl.
CPC ............ *H04B 5/0037* (2013.01); *G06K 7/0008* (2013.01); *G06K 7/10217* (2013.01); *G06K 19/0717* (2013.01)
USPC ........................................ 455/41.1; 455/67.11

(58) Field of Classification Search
CPC ........................... H04B 5/0037; G06K 7/10217
USPC .......... 455/67.11, 115.1, 41.1, 41.2, 274, 286, 455/292, 522, 127.1
See application file for complete search history.

(56) References Cited

U.S. PATENT DOCUMENTS

| | | | |
|---|---|---|---|
| 6,073,050 A | 6/2000 | Griffith | |
| 7,659,841 B1 * | 2/2010 | Newell | ........................ 341/120 |
| 2008/0042803 A1 | 2/2008 | Posamentier | |

FOREIGN PATENT DOCUMENTS

| | | |
|---|---|---|
| EP | 0583690 A2 | 2/1994 |
| FR | 2806563 A1 | 9/2001 |
| WO | 2006054070 A1 | 5/2006 |
| WO | 2007008949 A2 | 1/2007 |

OTHER PUBLICATIONS

International Search Report for PCT/EP2010/058002 dated Aug. 9, 2010.

(Continued)

*Primary Examiner* — Eugene Yun
(74) *Attorney, Agent, or Firm* — Sughrue Mion, PLLC

(57) ABSTRACT

In a monitoring device consisting of a reader and a data carrier, the reader (100) comprises a control unit (101), a memory (102), a digital signal generator (103), an output driver (104), resonance capacitors (105, 107) and a transmitter coil (106). The digital signal generator (103) is adapted for supplying a digital bit sequence selected among, at least two, bit sequences stored in the memory (102) whereby the strength of the magnetic field generated by the transmitter coil (106) can be varied dependent on the bit sequence selected by the control unit (101). The invention further provides a method of controlling the strength of a magnetic field generated by the reader of the monitoring device.

15 Claims, 3 Drawing Sheets

(56) References Cited

OTHER PUBLICATIONS

Anonymous, "Pulse-density modulation" (online) May 18 201, XP002592245, Wikipedia, the free encyclopedia retrieved from the internet: URL:http://en.wikipedia.org/w/index.php?title=Pulse-density-modulation&oldid+367792563—retrieved on Jul. 15, 2010—the whole document.

Notification of Transmittal with International Preliminary Report on Patentability for PCT/EP2010/058002 dated Jun. 8, 2010.

\* cited by examiner bit sequence #1: 0110101100101001100101001101010110
bit sequence #2: 1010101100101001100101001101010110
bit sequence #3: 0110110011001001100100110011010110
bit sequence #4: 0111001100110001100011001100110
bit sequence #5: 0110110101001001100100101011010110
bit sequence #6: 1011010011010010010010110010110101
bit sequence #7: 0111010101010001100010101010110
bit sequence #8: 1010111010001010010100010111010101
bit sequence #9: 0111011010010001100010010110110110
bit sequence #10: 110110010110010000100110100110011
bit sequence #11: 10111010101000100100010101011101
bit sequence #12: 11011010101001000010010101011011
bit sequence #13: 110111001100100001000110011011
bit sequence #14: 110111010100010000100010101011011
bit sequence #15: 11110101010100000000101010101111
bit sequence #16: 11110110100100000000100101101111

*Fig. 3*

| bit sequence | relative strength of first harmonic |
|---|---|
| #1 | 0.11 |
| #2 | 0.12 |
| #3 | 0.13 |
| #4 | 0.15 |
| #5 | 0.17 |
| #6 | 0.19 |
| #7 | 0.21 |
| #8 | 0.24 |
| #9 | 0.28 |
| #10 | 0.31 |
| #11 | 0.35 |
| #12 | 0.37 |
| #13 | 0.43 |
| #14 | 0.46 |
| #15 | 0.55 |
| #16 | 0.61 |

*Fig. 4*

MONITORING DEVICE AND METHOD FOR WIRELESS POWER TRANSMISSION IN A MONITORING DEVICE

RELATED APPLICATIONS

The present application is a continuation-in-part of application No. PCT/EP2010058002, filed on Jun. 8, 2010, in Europe and published as WO2011154036 A1.

BACKGROUND OF THE INVENTION

1. Field of the Invention

The present invention relates to monitoring devices. The invention more specifically relates to monitoring devices comprising a reader and a data carrier, adapted for wireless data and power transmission. The invention also relates to a method for controlling wireless power transmission in such a device.

2. The Prior Art

In the context of the present disclosure a monitoring device should be understood as a small device designed to be worn by a human user for continuous surveillance of a specific medical condition in the user. The monitoring device consists of a reader and a data carrier.

The reader is powered by an internal primary energy source, such as a battery. The data carrier does not have its own primary source of energy. Therefore the data carrier relies on a wireless inductive power transmission from the reader. A transmitter coil in the reader and a receiver coil in the data carrier together form a system of magnetically coupled inductors. The basic principle relies on generating an alternating current in the transmitter coil. The current in the transmitter coil generates a magnetic field which induces a current in the receiver coil. The current in the receiver coil is used to power the data carrier.

The data carrier has monitoring means, such as electrodes, for measuring EEG signals in the human user of the monitoring device. The data collected by the monitoring means are preprocessed by data processing means and wirelessly transmitted to the reader for further processing. The reader receives data from the data carrier through load-modulation of the data carrier. In a typical application the further processing in the reader includes determining if a specific medical condition has occurred in the user and alerting the user of this condition. Hereby the size and power consumption of the data carrier can be kept small because the battery and the main part of the signal processing is placed in the reader. This is advantageous in that it makes the data carrier feasible for implantation in the human user. It is especially advantageous to have the data carrier subcutaneously implanted with respect to measurement of EEG signals.

Efficient operation of the monitoring device requires that the inductive power transmission from the reader and to the data carrier is adjustable in strength. In case excessive power is transmitted to the data carrier, the excessive power will be lost, and in case insufficient power is transmitted to the data carrier, the data carrier will not be able to carry out its intended functions. Efficient operation of the monitoring device therefore requires a power control loop, where the data carrier sends information to the reader, enabling the reader to control the strength of the power transmission such that both excessive and insufficient power transmissions are avoided. It is also required that the strength of the power transmissions can be varied in a power efficient manner.

U.S. Pat. No. 6,073,050 discloses an efficient RF telemetry transmitter system including a first stage and a second stage. The transmitter system sends power and data to an implant device using pulse-width modulation of a high fixed frequency clock signal, e.g. a 49 MHz clock signal, within the first stage in order to provide efficient generation of an RF output signal in the second stage. Pulse-width modulation of the fixed frequency clock signal is used in order to optimally set the drive level of the output signal of the first stage. ON/OFF keying, or another modulation scheme, further modulates the clock signal with data in the first stage. The second stage includes a Class-E amplifier circuit.

It is a feature of the present invention to provide a monitoring device with improved means for inductive power transmission, hereby providing a monitoring device with reduced power consumption.

It is still another feature of the present invention to provide an improved method for controlling the strength of the inductive power transmission.

SUMMARY OF THE INVENTION

The invention, in a first aspect, provides a monitoring device consisting of a reader and a data carrier, wherein the reader comprises a control unit, a memory, a digital signal generator, an output driver, a resonance capacitor and a transmitter coil, wherein the digital signal generator is adapted for supplying a digital bit sequence selected among, at least two, bit sequences stored in the memory, wherein the bit sequences stored in the memory are pulse density modulated in order to represent distorted analog sine signals with a fixed first-order harmonic frequency and variable amplitude, whereby the strength of the magnetic field generated by the transmitter coil can be varied dependent on the bit sequence selected by the control unit, and wherein the bit sequences stored in the memory have been optimized with respect to a characteristic of another harmonic frequency.

This provides a monitoring device with reduced power consumption.

The invention, in a second aspect, provides a method for controlling the strength of an inductive power transmission between a reader and a data carrier in a monitoring system by controlling the strength of a magnetic field generated by the reader of the monitoring device, said method comprising the steps of: determining the desired strength of the magnetic field, providing bit sequences stored that are pulse density modulated in order to represent distorted analog sine signals with a fixed first-order harmonic frequency and variable amplitude, storing said sequences in a memory, selecting a digital bit sequence from the memory generating a digital signal by reading out said bit sequence with a predetermined clock frequency, generating a magnetic field by passing said digital signal through an output driver and a resonator circuit comprising at least a capacitor and a coil, and having bit sequences stored in the memory that have been optimized with respect to a characteristic of another harmonic frequency of the digital signal.

This provides a power efficient method for controlling the strength of an inductive power transmission between a reader and a data carrier in a monitoring system.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other embodiments, and its several details are capable of modification in various, obvious aspects all without departing from the invention. Accordingly, the drawings and descriptions will be regarded as illustrative in nature and not as restrictive. In the drawings:

FIG. 3 shows bit sequences according to an embodiment of the invention;

FIG. 4 shows the strength of the first-order harmonic for each of the bit sequences of FIG. 3.

DETAILED DESCRIPTION

Figure 1:
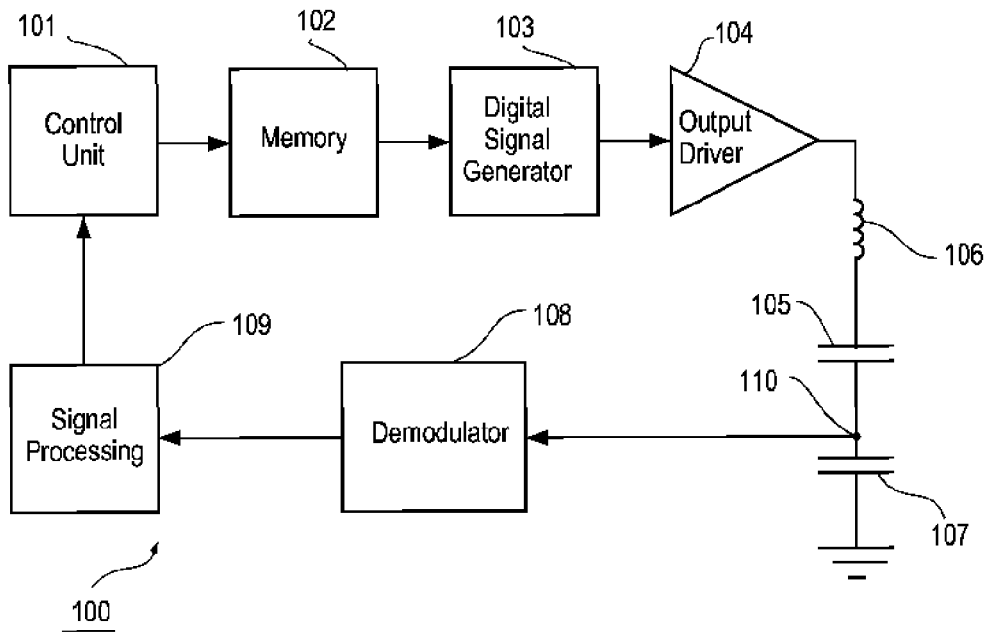
FIG. 1 illustrates highly schematically the reader of a monitoring device according to an embodiment of the invention.

Reference is first made to FIG. 1, which illustrates highly schematically the reader of a monitoring device according to an embodiment of the invention. The reader comprises a control unit 101, a memory unit 102, a digital signal generator 103, an output driver 104, a transmitter coil 106, a first resonance capacitor 105, a second resonance capacitor 107, a connection point 110, demodulator means 108 and signal processing means 109.

The transmitter coil 106 and the first and second resonance capacitors together form a resonant circuit that is tuned to a resonance frequency that corresponds to the transmission frequency of the wireless inductive power transmission from the reader.

The resonance capacitance is split in two in order to provide a suitable voltage at the connection point 110. The voltage at the connection point 110 can be load-modulated by the data carrier whereby data can be transmitted from data carrier to the reader. The amplitude-modulated analogue voltage at the connection point 110 is demodulated by the demodulator means 108, and a digital signal is provided as input to the signal processing means 109. The signal processing means 109 extracts information from the digital signal related to the strength of the wireless power received by the data carrier, and determines, based on this information, whether the strength of the power transmitted from the reader needs adjustment, and a corresponding control signal is fed to the control unit 101. In response to the control signal the control unit selects a bit sequence from the memory unit 102, where the bit sequence represents a desired strength of the power transmitted from the reader. The bit sequence is subsequently stored in and read out from the digital signal generator 103 with a predetermined clock frequency. The digital signal is amplified by the output driver 104, and the resonator circuit described above converts the digital signal to an analog sine signal with the desired amplitude for wireless power transmission to the data carrier.

In the embodiment of FIG. 1 the first capacitor has a value of 40 pF and the second capacitor has a value of 100 pF. Hereby a suitable load-modulated voltage can be provided at the connection point 110 for further processing by the demodulator means 108. In variations hereof the first capacitor has a value in the range of 25 to 75 pF, preferably in the range of 35 to 45 pF, and the second capacitor has a value in the range of 75 to 125 pF, preferably in the range of 95 to 105 pF.

In the embodiment of FIG. 1 the control unit 101 comprises a look-up table where the control signal from the signal processing means 109 is used for selecting the bit sequence from the memory unit 102. The signal processing means 109 comprises an algorithm that determines the control signal based on a feedback loop adapted to control the dynamic behavior of the power transmission from the reader and to the data carrier. Such algorithms are well known from the art of control theory. In the embodiment of FIG. 1 a Proportional-Integral-Derivative (PID) controller is used for controlling the feedback loop.

In the embodiment of FIG. 1 the memory unit 102 consists of 16 bit sequences each having 32 bits, and the internal clock frequency of the digital signal generator 103 is 32 MHz. The bit sequences are selected such that the resulting digital signal represents a distorted sine signal having a fundamental frequency of 1 MHz, each of the bit sequences representing a full period of a distorted sine signal. The fundamental frequency corresponds to the resonance frequency of the selected resonator circuit of the reader and data carrier, and the fundamental frequency constitutes the carrier frequency for the wireless transmission between the reader and the data carrier. By selecting a carrier frequency of 1 MHz a monitoring device is provided that can be made smaller than devices having a lower carrier frequency because the requirements to the minimum size of the transmitter coil on the reader and the receiver coil on the data carrier are relaxed when the carrier frequency is increased. Generally the Q factor of the resonance circuits will increase with the carrier frequency. For a monitoring device according to various embodiments of the invention this proportionality starts to diminish about 1 MHz due to the skin effect. It has been found that the power efficiency of the monitoring device can be increased with a factor of say 4 by increasing the carrier frequency from about 100 kHz to about 1 MHz.

In variations of the embodiment of FIG. 1 the carrier frequency has a value in the range between 900 kHz and 1100 kHz.

It has been found that the resonance capacitors 105 and 107 at an operating frequency of 1 MHz can have capacitances in the range between 25 and 125 pF which is well above the parasitic capacitances of the integrated circuit and printed circuit board. As opposed to this, a resonance capacitor with a capacitance in the range between 2 and 5 pF is required for an operating frequency of 10 MHz. Such small capacitance values are difficult to implement because they are too similar to the parasitic capacitances, that by their nature are unpredictable.

In the embodiment of FIG. 1 the bit sequences are pulse density modulated in order to represent distorted analog sine signals with a fixed fundamental frequency and variable amplitude. The bit sequences are further optimized for having approximately the same zero-order harmonic. Hereby the strength of the first-order harmonic (i.e. the fundamental frequency) can be varied without any corresponding changes of the zero-order harmonic, and this will generally facilitate the demodulation of the load-modulated signal.

It is a specific advantage of the pulse density modulated bit sequences according to the invention, as opposed to e.g. pulse width modulated bit sequences, that the pulse density modulated bit sequences can be optimized with respect to suppression of specific harmonics.

In a variation of the embodiment of FIG. 1 the bit sequences are selected such that all the higher-order harmonics are suppressed as much as possible. In another variation suppression of the second-order harmonic is given the highest weight, because the second-order harmonic is attenuated the least by the resonator circuit relative to the other higher-order harmonics. The larger the content of higher-order harmonics in the signal the more distorted the sine signal will be, and the distortion will generally be disadvantageous for the demodulation of the load-modulated signal.

According to another embodiment of the invention, the bit sequences are selected in a three step process. In the first step the bit sequences having a predetermined fundamental frequency (i.e. first-order harmonic) are selected. In the second step a range of groups of bit sequences are selected, wherein each group comprises bit sequences with a first-order harmonic of a predetermined strength, and in the third and final step a bit sequence from each group is selected such that the selected bit sequences have approximately the same strength of the zero-order harmonic.

Reference is now made to FIG. 3, which shows 16 different bit sequences according to an embodiment of the invention.

Reference is then made to FIG. 4, which shows a representation of the strength of the first-order harmonic for each of the bit sequences given in FIG. 3. The strength of the first-order harmonic represents the power transmitted from the reader and to the data carrier. It follows directly that the strength of the power transmitted to the data carrier can be controlled through the selection of an appropriate bit sequence.

The strength of a harmonic in the bit sequence can be determined by transforming the bit sequence into the frequency domain. As one example this can be carried out using a Fast Fourier Transformation (FFT).

In the embodiment of FIG. 1 the digital signal generator is a simple shift register. This provides a very simple implementation of the digital signal generator.

In the embodiment of FIG. 1 the output driver 104 is a Class D amplifier. In variations hereof the output driver can be any type of digital switching amplifier. This provides an output driver that is very power efficient.

Figure 2:
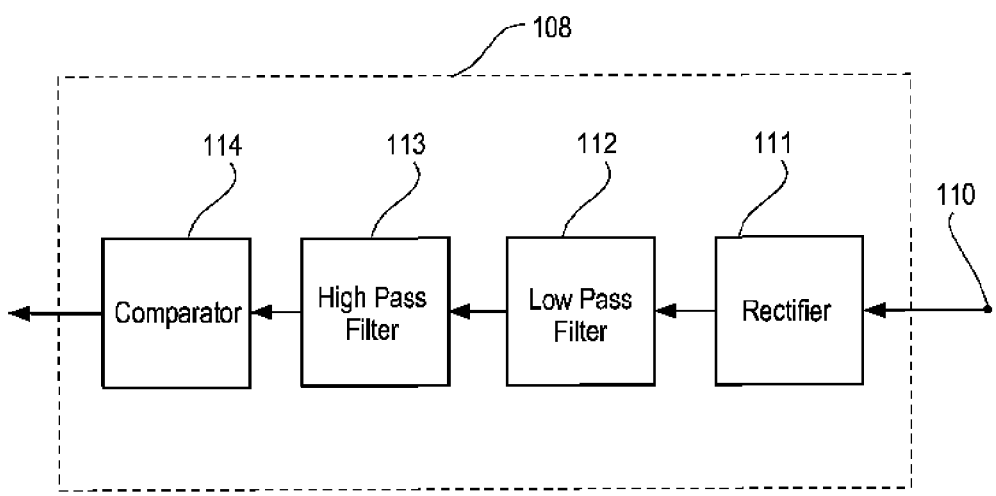
FIG. 2 illustrates highly schematically the demodulator means of the reader according to an embodiment of the invention.

Reference is now made to FIG. 2, which illustrates highly schematically the demodulator means 108 according to an embodiment of the invention. The demodulator means 108 comprises a full wave rectifier 111, a low pass filter 112, a high pass filter 113 and a comparator 114. The signal from the connection point 110 is rectified in the full wave rectifier 111 and fed to the low pass filter 112 and from there to the high pass filter 113 and further on to the comparator 114 which outputs a digital signal that can be further processed in the signal processing means 109. The full wave rectifier 111 provides that the signal, from the connection point 110, has no negative voltage values, and the low pass filter 112 is adapted to provide the envelope of the signal by removing the carrier frequency. The high pass filter 113 provides an envelope signal, where the DC component is removed, and this signal is input to the comparator 114 which provides a binary digital signal, which comprises the data transmitted from the data carrier, for further processing in the digital signal processing means 109.

In a variation of the embodiment of FIG. 2 the analog signal from the connection point 110 is attenuated to prevent saturation of the demodulator means 108.

According to an embodiment the speed of the wireless data transmission is selected within the range of 1 to 50 kHz, preferably about 10 kHz, and the internal clock frequency of the reader is selected within the range of 10 MHz and 75 MHz, preferably about 32 MHz. This selection of a relatively low data transmission speed relative to the high internal clock frequency facilitates synchronization of the data stream to the internal clock of the reader.

According to an embodiment the data transmitted from the data carrier are encoded in a Manchester code for providing simple recovery of the data clock.

According to an embodiment the data carrier measures a voltage induced by the power transmission from the reader, where said voltage is used for supplying power to the signal processing circuitry on the data carrier. The voltage is converted to the digital domain and transmitted back to the reader in order to allow the reader to control the strength of the magnetic field transmitted to the data carrier by selecting an appropriate bit sequence. The voltage is measured 250 times per second.

According to an embodiment the strength of the magnetic field can be varied with a factor in the range between 5 and 15. This corresponds to the typical variation in coupling factor for inductive transmission between a data carrier, subcutaneously implanted in the head of a user, and a reader worn at or behind the ear of the user.

Further details concerning prior art data carriers adapted for wireless power supply and wireless data transmission using load-modulation of the data carrier can be found in the book by Klaus Finkenzeller: "RFID handbook: fundamentals and applications in contactless smart cards and identification", John Wiley & Sons, (2003).

Figure 5:
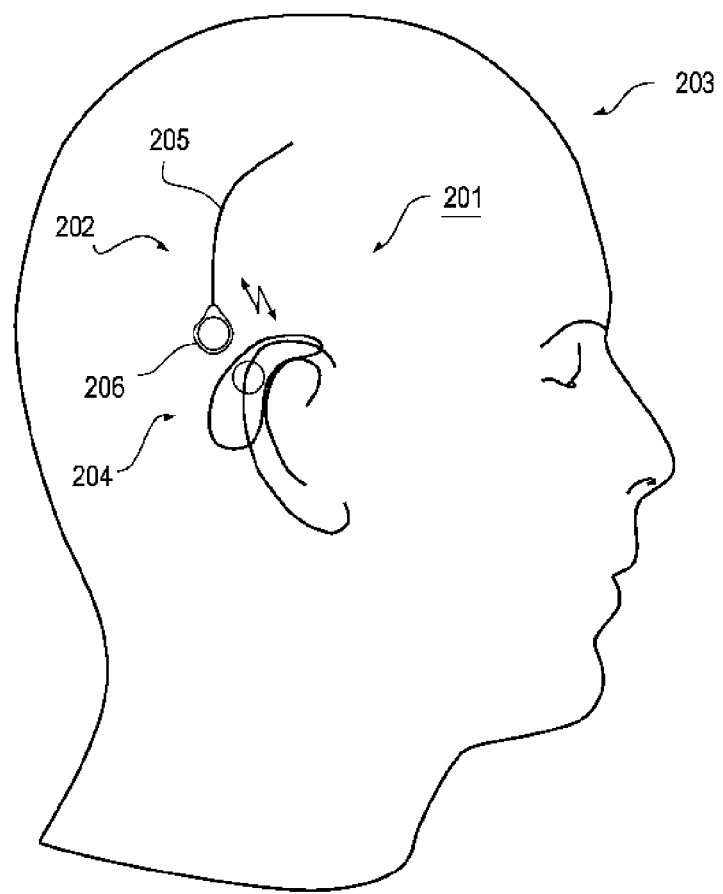
FIG. 5 illustrates schematically a monitoring device according to an embodiment of the invention.

Reference is now made to FIG. 5, which illustrates schematically a monitoring device for continuous surveillance of a specific medical condition in the user according to an embodiment of the invention. The monitoring device 201 consists of two separate mechanical parts, a data carrier 202 that is configured for subcutaneous implantation behind the ear of a person 203 carrying the monitoring device 201 and a reader 204 adapted for positioning behind the ear of the user. The data carrier 202 can be further divided into a first implanted subpart 205 and a second implanted subpart 206. The first implanted subpart 205 consists of a probe having two active areas, where each active area constitutes an electrode, for contacting subcutaneous tissue in order to detect the presence of an electrical signal, such as an EEG signal. The second implanted subpart 206 includes signal processing circuitry, and a receiver coil. The reader 204 also includes signal processing circuitry, and a transmitter coil.

The wireless connection, provided by the two inductively coupled coils, between the data carrier 202 and the reader 204 serves two general purposes. The first is to transmit the digital electrode signal from the data carrier 202 and to the reader 204 for further analysis and processing. The second purpose is to transmit power from the reader 204 and to the data carrier 202. Therefore the data carrier does not have its own source of energy and instead relies on the wireless inductive power transmission from the reader 204, whereas the reader 204 is battery powered.

Other modifications and variations of the structures and procedures will be evident to those skilled in the art.

The invention claimed is:

1. A monitoring device consisting of a reader and a data carrier, wherein the reader comprises a control unit, a memory, a digital signal generator, an output driver, a resonance capacitor and a transmitter coil, wherein the digital signal generator is adapted for supplying a digital bit sequence selected among, at least two, bit sequences stored in the memory, wherein the bit sequences stored in the memory are pulse density modulated in order to represent distorted analog sine signals with a fixed first-order harmonic frequency and variable amplitude, whereby the strength of the magnetic field generated by the transmitter coil can be varied dependent on the bit sequence selected by the control unit, and wherein the bit sequences stored in the memory have been optimized with respect to a characteristic of another harmonic frequency.

2. The monitoring device according to claim 1, wherein the reader comprises demodulation means and signal processing means, whereby a data signal from the data carrier, comprising information related to the strength of the magnetic field received by the data carrier, can be analyzed by the signal processing means, and a bit sequence can be selected in response to this analysis.

3. The monitoring device according to claim 1, wherein the digital signal generator is a shift register.

4. The monitoring device according to claim 1, wherein the bit sequences stored in the memory have been optimized for having approximately the same strength of the zero-order harmonic.

5. The monitoring device according to claim 1, wherein the bit sequences stored in the memory have been optimized for minimizing the strength of the second-order harmonic.

6. The monitoring device according to claim 1, wherein the bit sequences stored in the memory have been optimized for minimizing the strength of all the higher-order harmonic frequencies.

7. The monitoring device according to claim 1, wherein the bit sequences stored in the memory provide a digital signal with a fundamental frequency in the range between 900 kHz and 1100 kHz.

8. The monitoring device according to claim 1, wherein the reader is adapted to be worn behind the ear of a user.

9. The monitoring device according to claim 1, wherein the data carrier is adapted to be subcutaneously implanted in a human user.

10. The monitoring device according to claim 1, wherein the data carrier comprises monitoring means for surveillance of a specific medical condition in the user.

11. The monitoring device according to claim 10, wherein the monitoring means comprises electrodes adapted for measuring EEG signals in the human user.

12. A method for controlling the strength of an inductive power transmission between a reader and a data carrier in a monitoring system by controlling the strength of a magnetic field generated by the reader of the monitoring device, said method comprising the steps of: determining the desired strength of the magnetic field, providing bit sequences that are pulse density modulated in order to represent distorted analog sine signals with a fixed first-order harmonic frequency and variable amplitude, storing said bit sequences in a memory, selecting a digital bit sequence from the memory, generating a digital signal by reading out said bit sequence with a predetermined clock frequency, generating a magnetic field by passing said digital signal through an output driver and a resonator circuit comprising at least a capacitor and a coil, and having bit sequences stored in the memory that have been optimized with respect to a characteristic of another harmonic frequency of the digital signal.

13. The method according to claim 12, comprising the steps of: selecting a first group of bit sequences having a predetermined fundamental frequency, selecting from said group at least two sub-groups of bit sequences wherein each of said sub-groups contains bit sequences with a first-order harmonic of approximately the same strength, and selecting from each sub-group a bit sequence such that said selected bit sequences, from respective sub-groups, have approximately the same strength of the zero-order harmonic and span a range of strengths of the first-order harmonic.

14. The method according to claim 13, wherein said range of strengths of the first-order harmonic spans a range of at least a factor of five.

15. The method according to claim 12, comprising the steps of: selecting a first group of bit sequences having a predetermined fundamental frequency, selecting from said group at least two sub-groups of bit sequences wherein each of said sub-groups contains bit sequences with a first-order harmonic of approximately the same strength, and selecting from each sub-group a bit sequence such that said selected bit sequences, from respective sub-groups, have suppressed the strength of the second-order harmonic and span a range of strengths of the first-order harmonic.

\* \* \* \* \*